Figure 1:
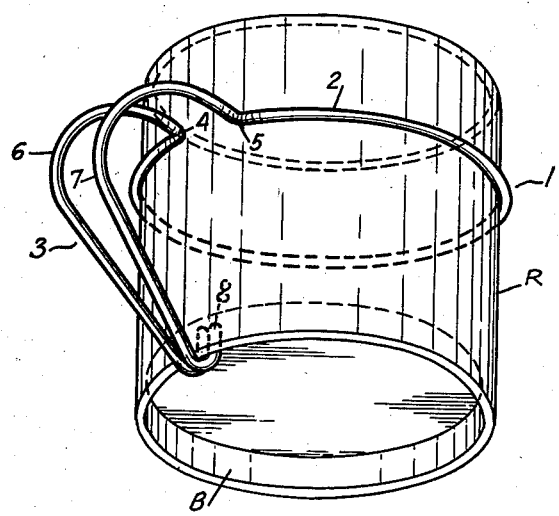

INVENTOR.
BENJAMIN MACKILBANK

Patented Feb. 9, 1937

2,070,367

UNITED STATES PATENT OFFICE 2,070,367

DETACHABLE HANDLE FOR RECEPTACLES

Benjamin Mackilbank, Brooklyn, N. Y.

Application May 25, 1934, Serial No. 727,513

1 Claim. (Cl. 16—114)

The present invention relates to a detachable handle for receptacles and containers, and is particularly adapted for use with food cartons.

The conventional form of food carton is made of paper or cardboard in the form of a cylindrical or frusto-conical tube closed at one end and provided with a detachable lid for its dispensing end. Due to the fact that food cartons for sanitary reasons are used but once and the cost must be kept at a minimum, they are not ordinarily provided with handles. For this reason they are not very well adapted for use with liquids, particularly hot beverages such as coffee and soup. Furthermore, the carton becomes soggy and often too hot to be held comfortably, resulting in many instances in the accidental spilling of the contents. Any one who has ever tried to drink hot coffee from a carton on a train knows the shortcomings of the most commonly used form of food containers.

In my prior application (application Serial No. 694,840 filed October 23, 1933), I have disclosed a detachable handle for a food carton of the foregoing type, which is suitable for attachment to any one of a large variety of forms and sizes of food cartons, which will support and reenforce the carton and will adapt the carton for use as a cup, and which is of such comparatively simple and inexpensive construction that it may be thrown away with the carton.

The present invention is in the nature of an improvement on the invention disclosed in my prior application.

Figure 2:
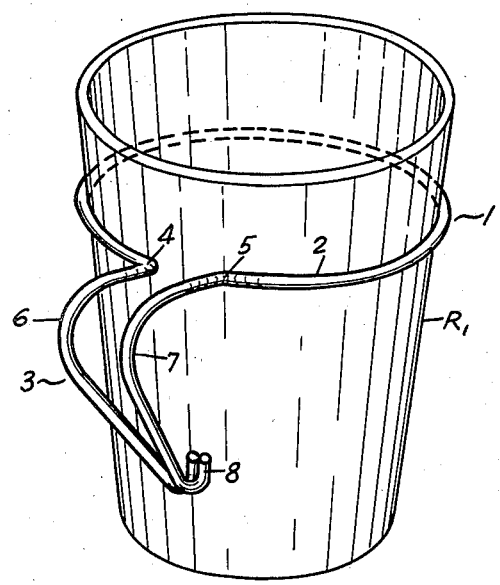

Referring briefly to the drawing, wherein is shown an illustrative embodiment of the invention:

Figure 1 is a perspective view showing a handle in position upon a cylindrical form of food carton; and Figure 2 is a perspective view showing the same or similar handle in position upon a food carton of frusto-conical form.

Referring in greater detail to the drawing, the reference character 1 in both figures designates generally the preferred form of device embodying the inventive concept. As shown in said figures, the device consists of a wire or cylindrical rod, a portion of which is fashioned into the horizontal split ring 2 and the remaining portion of which is formed into the vertically disposed loop 3. The separated ends of the split ring 2 are denoted by the reference numerals 4 and 5 and merge into the vertical loop 3.

The vertical loop 3 is fashioned into the two vertical ears 6 and 7. As shown each ear extends outwardly from the ends 3 and 4 of the horizontal split ring 2 and their lower ends are connected together in any suitable manner as by soldering or welding and bent upwardly to form a hook 8.

The device is preferably formed from a cylindrical rod or wire of substantially resilient material such as steel. The gauge or size of the wire depends upon the size and weight of the carton to which the hande is to be applied.

In Figure 1 the device or handle is illustrated as applied to a food carton R of cylindrical form. The split ring 2 is of somewhat smaller diameter than the carton so that when the carton is inserted from the top, the split ring expands and clamps the carton tight. The hook 8 is in such position in relation to the rest of the device that it catches in the bead or flange B of the carton, thus supporting the weight of the carton and effectively preventing the carton from slipping through the ring.

In Figure 2 I have shown the handle as applied to a carton R' of the frusto-conical type. The taper of the particular carton illustrated is such that the hook 8 instead of catching in the bead when the carton is inserted into the split ring presses against the side of the carton and increases the grip or clamping action of the device. If the taper of the carton is very slight, the device can be used as in the case of a cylindrical carton (Figure 1).

It is thought to be obvious from the foregoing description that the device enables the carton to be used as a cup and that it is of such inexpensive construction that it may be thrown away with the carton.

The foregoing embodies the essential and distinctive thought of my invention, but it will, of course, be understood that the same may be combined with other features without affecting the peculiar results obtained and that changes and modifications may be resorted to as to details without departing from the spirit and scope of my invention.

I claim:

As an article of manufacture, a detachable holder or handle for a receptacle of the food carton type, said holder consisting of a resilient wire bent into a horizontal split ring for encircling the receptacle and a vertical loop, said loop being in the form of an ear providing a handle for said receptacle, the lower end of said loop being bent into an upwardly extending hook, said hook being adapted to catch under the bottom bead or flange of the receptacle in the case of cartons having a slight taper, and to press against the outer surface of the carton in the case of cartons having a considerable taper.

BENJAMIN MACKILBANK.